3,127,420
$N^1$ - [(5 - NITRO - 2 - FURYL)ALKYLIDENE] - $N^2$-SUBSTITUTED $N^2$ - (N - SUBSTITUTED CARBAMOYLALKYL) HYDRAZINES
Frank F. Ebetino, Norwich, N.Y., assignor to The Norwich Pharmacal Company, a corporation of New York
No Drawing. Filed July 27, 1961, Ser. No. 127,156
10 Claims. (Cl. 260—347.3)

This invention relates to new chemical compounds and the preparation thereof. More particularly this invention is concerned with a closely related series of $N^1$-[(5-nitro - 2 - furyl)alkylidene] - $N^2$ - substituted - $N^2$ - (N-substituted carbamoylalkyl) hydrazines comprising compounds possessing antimicrobial activity and compounds useful in the preparation thereof.

The series of comopunds of this invention may be represented by the Formula (I):

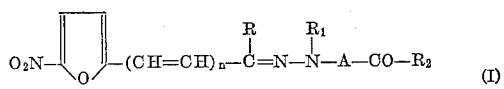
(I)

wherein $n$ represents 0–1;
R represents hydrogen or methyl;
$R_1$ represents hydrogen, acyl, alkoxycarbonyl, haloalkoxycarbonyl or cyclohexylcarbonyl;
A represents an alkylene group; and
$R_2$ represents amino, hydroxyl, dialkylamino, alkylamino, hydroxyalkylamino, acetylamino, phenylamino, piperidyl, morpholinyl or pyrrolidyl.

The members of this series which are useful in synthesis and particularly useful as intermediates in the preparation of other members of the series are those within the ambit of Formula I more specifically represented by Formula II:

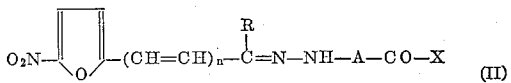
(II)

wherein $n$ represents 0–1;
A represents an alkylene group;
R represents hydrogen or methyl; and
X represents amino, alkylamino, or hydroxyl.

The preparation of these new intermediates, according to the currently preferred method, involves the reaction of α-hydrazinoaliphatic acid or amide with a nitrofuran carbonyl compound or a functional derivative thereof readily hydrolyzable thereto. Schematically this reaction may be represented by the following equation:

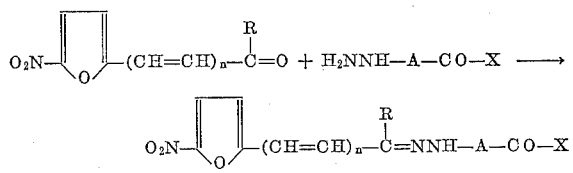

wherein the symbols R, A and X have the significance ascribed above. In lieu of the nitrofuran carbonyl compound, a carbonyl compound such as acetone, methyl ethyl ketone, benzaldehyde or the like may be employed in the reaction and the condensation product subjected to hydrolytic treatment in the presence of a nitrofuran carbonyl compound to effect exchange therefor.

The reactants are brought together, preferably in the presence of an inert solvent as a reaction medium. Suitable, readily available, inert solvents are alkanols, dimethylsulfoxide, dimethylformamide, dioxane, aliphatic acid esters, and nitromethane. The reaction product is recovered by filtration and recrystallized, if desired. The reaction may be carried out at ambient temperature or, to facilitate it, heat can be supplied. It is desirable to conduct the reaction at a slightly acid pH of about pH 5–7. Such pH can be achieved by adding an acid, for instance, acetic acid to the reaction mixture. If desired, a more acidic medium can be produced by the addition of an acid such as hydrochloric to insure completion of the reaction and full recovery of desired end product.

These intermediates may be used in a number of ways in the preparation of other members of this series. The method adapted to the preparation of a particular member is dictated largely by choice and feasibility. Methods which are currently preferred in the preparation of antimicrobially active members falling within the ambit of Formula I and being more specifically described by Formula III:

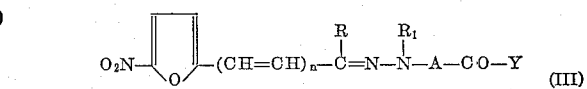
(III)

wherein $n$ represents 0–1;
R represents hydrogen or methyl;
$R_1$ represents acyl, alkoxycarbonyl, haloalkoxycarbonyl or cyclohexyloxycarbonyl;
A represents an alkylene group; and
Y represents amino, dialkylamino, alkylamino, acetylamino, hydroxyalkylamino, phenylamino, piperidyl, pyrrolidyl or morpholinyl;

include:

(1) Reacting an intermediate represented by Formula II in which X is an amino or alkylamino group with an acid halide, acid anhydride or alkyl haloformate. In carrying out this reaction, the reactants are merely brought together in a suitable reaction vessel. When an acid anhydride is a reactant, it is not necessary to use a solvent. It is preferable, when an anhydride is a reactant, in order to hasten the reaction, to raise the temperature of the reaction mixture above ambient temperature and to stir the mixture until uniform. In the case of acid halide and alkyl haloformate reactants, an inert solvent is preferably employed. Suitable solvents are dimethylformamide and pyridine which, in addition to being reaction vehicles, serve as acceptors for acidic substances produced in the course of the reaction. In the reactions involving acid halides and alkyl haloformates it is preferable to maintain the reaction mixture at about ambient temperature by cooling, if necessary.

The end products may be recovered from the reaction mixture by cooling or by pouring the mixture into water and basifying, if desired, with an agent such as sodium carbonate followed by filtration. They may be recrystallized from suitable solvents such as ethanol, isopropanol, nitromethane, acetonitrile or dimethylformamide.

(2) Reacting an intermediate represented by Formula II in which X is hydroxyl with a halogenating agent such as phosphorous pentachloride followed by treatment of the halide so produced with an amine. In carrying out this reaction, a mixture of the nitrofurfurylidenehydrazinoaliphatic acid and halogenating agent, for instance, phosphorous pentachloride, preferably in the presence of an inert diluent such as benzene, is gently heated at about 50° C. until evolution of gas subsides. The temperature is then gradually increased until refluxing occurs. After refluxing briefly, the mixture is cooled and filtered. The appropriate amine is added to the filtrate in sufficient quantity to produce a slightly basic medium. The end product which precipitates is filtered. It may be recrystallized from a suitable solvent such as ethanol, isopropanol or acetonitrile.

Members of this series represented by Formula III are particularly valuable as medicinal agents. They possess a broad antimicrobial spectrum and are inimical in very small quantities to microorganisms. Systemic diseases provoked by various microorganisms such as *Staphylococcus aureus, Escherichia coli, Eimeria tenella, Histomonas meleagridis* and *Syphacia obvelata*, are amenable to treatment with doses only a fraction of the toxic dose of these members. A particularly outstanding chemotherapeutic response is obtained in the treatment of resistant staphylococcal infections. Also noteworthy is their systemic activity against *E. coli* infection such as is frequently encountered in pyelonephritis.

Protozoan diseases of poultry are effectively combated through the administration of these members. Coccidiosis in chickens and enterohepatitis in turkeys are among the diseases of poultry flocks which are susceptible.

Another outstanding feature of these members is their resistance to metabolic destruction. They possess the valuable atttibute of appearing in antibacterial amount in the urine of animals to whom they have been administered per os in very low dosage. Because of this behavior they are useful as urinary tract antiseptics.

These members are relatively non-toxic. Their highest tolerated dose ranges from 400–2200 mg./kg. in mice. Other species receiving therapeutic quantities of them have manifested no undue toxic response.

The administration of these members is easy. Pharmaceutical dosage forms may be formulated in conventional fashion using common excipients and adjuvants of the art in the making of tablets, suspensions, elixirs, capsules, troches, and the like. In veterinary use the feed and drinking water supply of animals offer a convenient medium for dispensing them.

These members differ somewhat from one another in degree of chemotherapeutic activity. The compound which is currently preferred is 2-[1-acetyl-2-(5-nitrofurfurylidene)hydrazino] acetamide. When administered as a suspension in aqueous sodium carboxymethylcellulose to mice lethally infected with a resistant strain of *Staphylococcus aureus*, a dose as low as 30 mg./kg. is effective in preventing death.

In order that this invention may be readily available to those skilled in the art, the following illustrative examples of the preparation of members of this series are appended.

EXAMPLE I 2-(5-Nitro-2-Furfurylidenehydrazino)Acetamide

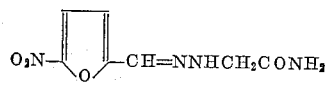

1020 g. (7.25 moles) of methyl hydrazinoacetate hydrochloride are dissolved in 10,200 ml. of concentrated ammonium hydroxide hydroxide solution and the solution allowed to stand at room temperature in a stoppered flask for 35 minutes. Air is bubbled through the solution for 3½ hours to remove excess ammonia. The solution is then acidified to approximately pH 5 (Hydrion paper) with 7200 ml. of acetic acid. The viscous solution is diluted with 10,000 ml. of water and then treated with a charcoaled solution of 920 g. (6.25 moles) of 5-nitro-2-furaldehyde dissolved in 6000 ml. of methanol; added in a thin stream over a period of 40 minutes. The yellow solid which forms is stirred about 25 minutes after completion of the addition and allowed to stand at room temperature overnight. The solid is collected on a filter. It is washed by stirring for 30 minutes with 20 liters of water. It is washed further with 14 liters of 50% methanol. The filter cake is rinsed with 2500 ml. of ether. It is dried in a 60° C., forced-draft oven. The yield of 2-(5-nitro-2-furfurylidenehydrazino) acetamide is 1152 g. (75% of the theoretical), M.P. 202.5–204.5° C.

EXAMPLE II

N-Ethyl-2-(5-Nitrofurfurylidenehydrazino)Acetamide

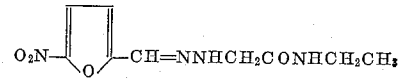

Methyl hydrazinoacetate hydrochloride (70 g., 0.5 mole) is added to a solution of 300 ml. of 70% ethylamine and 300 ml. of water and the resulting solution allowed to react at room temperature for 5 hours. The pH is adjusted to 5–6 by adding acetic acid with cooling, and then a solution of 70 g. (0.5 mole) of 5-nitrofurfural in 250 ml. of alcohol is added. After stirring for several minutes the mixture is cooled, the solid filtered and washed with a 50:50 mixture of isopropanol-ether. Recrystallization from 800 ml. of isopropanol with charcoal gives 70 g. (58%), M.P. 145–148° C., of N-ethyl-2-(5-nitrofurfurylidenehydrazino) acetamide.

EXAMPLE III (5-Nitrofurfurylidenehydrazino) Acetic Acid

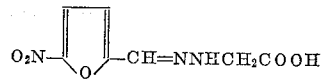

To a solution of 4.02 liters (4120 g.) of 85% hydrazine hydrate and 826 g. of sodium hydroxide in a 12 liter flask heated to 90° C. is added a solution of 945 g. (10 moles) of chloroacetic acid in 1.5 liters of water over 2 hours, keeping the temperature at 100–105° C. The solution is then refluxed for 1 hour and distilled in vacuo until 3.5–4 liters of distillate are collected. The residue is treated with 1.5 gallons of polyglycol 400 and distillation continued until no more distillate is collected. The mixture is filtered hot and the solid rinsed several times with methanol and dried in the steam oven. The yield of sodium hydrazino-acetate is 1530 g.

A charcoaled solution of 500 g. (4.46 moles) of sodium hydrazino-acetate in 1.8 liters of water is adjusted to pH 6 with glacial acetic acid with cooling and treated with a solution of 3.75 g. (2.66 moles) of 5-nitrofurfural in 2.8 liters of alcohol. After stirring for several minutes an orange precipitate separates. The mixture is cooled and the solid filtered and washed with isopropanol. The yield of sodium (5-nitrofurfurylidenehydrazino)acetic acid is 304 g. (29%), M.P. 165–175° C.

A charcoaled solution of 87 g. of the sodium salt in 1.6 liters of water is acidified with 10% hydrochloric acid. The yellow solid is filtered and rinsed with water. The yield of (5-nitrofurfurylidenehydrazino)acetic acid is 63.8 g., M.P. 132–135° C.

EXAMPLE IV

[1-Acetyl-2-(5-Nitrofurfurylidene)Hydrazino]Acetic Acid

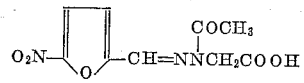

A suspension of 100 g. (0.425 mole) of sodium 5-nitrofurfurylidenehydrazinoacetate (Example III) in 300 ml. of acetic anhydride is heated on the steam bath for 10 minutes with stirring. The mixture is cooled and treated with ether to give a yellow solid (111 g.). The solid is added to 2100 ml. of water and the mixture adjusted to pH 8 with 10% sodium carbonate solution. After adding a filtering aid (Celite) the mixture is filtered and the filtrate acidified with 10% hydrochloric acid to give a yellow solid. The yield of [1-acetyl-2-(5-nitrofurfurylidene)hydrazino]acetic acid is 69 g. (64%), M.P. 213–218° C.

EXAMPLE V

*2-[3-(5-Nitro-2-Furyl)Allylidenehydrazino]Acetamide*

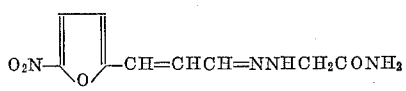

A solution of 281 g. (2 moles) of methyl hydrazinoacetate hydrochloride in 2800 ml. of 68% ammonium hydroxide is allowed to stand at room temperature for 35 minutes, charcoaled and excess ammonia removed with an air bubbler. The pH is adjusted to 6 by adding acetic acid with cooling, and one-half of the solution is added to a hot alcoholic solution of 167 g. (1 mole) of 3-(5-nitro-2-furyl)acrolein in 4 liters of alcohol. After cooling the red solid is filtered and rinsed with alcohol, water and then alcohol to give 100 g. (42%), M.P. 190–194° C., of 2-[3-(5-nitro-2-furyl)allylidenehydrazino]acetamide.

EXAMPLE VI

*2-(α-Methyl-5-Nitrofurfurylidenehydrazino)Acetamide*

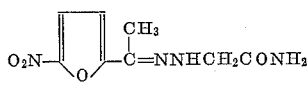

To a solution of 155 g. (1 mole) of methyl 5-nitro-2-furyl ketone in 2.5 liters of warm alcohol is added a solution of 1 mole of hydrazinoacetamide (see Example V). An orange solid separates on cooling which is filtered and recrystallized from 3.2 liters of alcohol. The yield of 2 - (α-methyl-5-nitrofurfurylidenehydrazino)acetamide is 114 g. (48%), M.P. 167–170° C.

EXAMPLE VII

*N-Methyl-2-(5-Nitrofurfurylidenehydrazino)Acetamide*

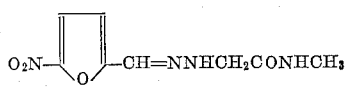

A solution of 70 g. (0.5 mole) of methyl hydrazinoacetate hydrochloride in 500 ml. of 40% methylamine is allowed to stand at room temperature for 4 hours and then adjusted to pH 5–6 with acetic acid with cooling. The solution is added to 70 g. (0.5 mole) of 5-nitrofurfural in 250 ml. of alcohol to give an orange solid. The solid is filtered, rinsed with isopropanol, water and isopropanol and dried. The yield of N-methyl-2-(5-nitrofurfurylidenehydrazino)acetamide is 99 g. (88%), M.P. 155–163° C. Recrystallization of 40 g. of the solid from 750 ml. of alcohol gives 36 g. (80%), M.P. 162–164° C.

EXAMPLE VIII

*2-(5-Nitrofurfurylidenehydrazino)Propionamide*

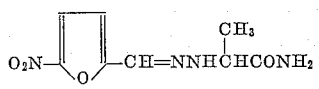

To a solution of 210 g. (4.2 moles) of 100% hydrazine hydrate in 300 ml. of alcohol is added a solution of 150 g. (1.38 moles) of α-chloropropionic acid in 300 ml. of alcohol over 1 hour. The emulsion is heated at reflux for 45 minutes, stirred for 15 minutes and saturated with dry HCl gas. The mixture is heated at reflux for 1 hour and filtered hot. The hydrazine dihydrochloride is rinsed with alcohol and ether. The combined filtrates are cooled overnight to yield a white solid which is rinsed with ether. The yield of ethyl α-hydrazinopropionate is 115 g. (49.5%), M.P. 90–100° C. The combined filtrates are cooled further to give 27 g. (11.6%), M.P. 103–106° C.

A solution of 12 g. of ethyl α-hydrazinopropionate in 120 ml. of ammonia is allowed to stand at room temperature overnight. After filtering, excess ammonia is removed with an air bubbler and with cooling the solution is adjusted to pH 6–7 with acetic acid. To this solution is added 10.1 g. of 5-nitrofurfural in 480 ml. of alcohol. The orange solid is filtered; rinsed with isopropanol, water and isopropanol; and dried to give 9.4 g. (58%) of 2-(5-nitrofurfurylidenehydrazino)propionamide, M.P. 178–180° C. Recrystallization of 5.0 g. of the solid from 1300 ml. of acetonitrile gives 4.0 g. (46.5%), M.P. 181.5–184° C.

EXAMPLE IX

*2-[1-Actyl-2-(5-Nitrofurfurylidene)Hydrazino] Acetamide*

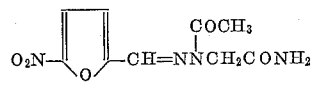

750 g. (3.54 moles) of the compound of Example I is added over a four minute period to 3400 ml. of well-stirred, preheated acetic anhydride. The resulting temperature is 108° C. The mixture is then heated to reflux (136° C.) with stirring. After the mixture has remained at reflux temperature (136–137° C.) for three minutes, heat is removed and stirring is continued for 5 more minutes; the temperature drops to 130° C. during this time. The mixture is then cooled for 48 minutes in an ice water bath to 8° C. The precipitate is collected on a sintered glass filter; the filter cake is packed and layered with 700 ml. of acetic anhydride to remove the dark mother liquor, and then rinsed with 500 ml. of ether. After being air dried overnight, the yield of 2-[1-acetyl-2-(5-nitrofurfurylidene)hydrazino] - acetamide is 652 g. (72% of theoretical, 898 g.)

EXAMPLE X

*2-[2-(5-Nitrofurfurylidene)-1-Propionylhydrazino] Acetamide*

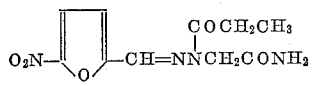

A suspension of 75 g. (0.354 mole) of the compound of Example I in 375 ml. of propionic anhydride is heated at 140–150° C. for 5–10 minutes to completely dissolve the solid. On cooling, the product, 2-[2-(5-nitrofurfurylidene)-1-propionylhydrazino]acetamide, separates and is filtered and washed with alcohol. Recrystallization from nitromethane (40 g./400 ml.) gives 28.7 g. (30%), M.P. 220–227° C., of pure compound.

EXAMPLE XI

*2-[1-Butyryl-2-(5-Nitrofurfurylidene)Hydrazino] Acetamide*

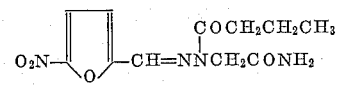

A suspension of 100 g. (0.47 mole) of the compound of Example I in 400 ml. of butyric anhydride is heated at 135–140° C. for 10 minutes to completely dissolve the solid. The solid than precipitates on cooling is filtered and rinsed with isopropanol. After two recrystallizations from alcohol 40 g. (30%), M.P. 193–195° C., of 2-[1-butyryl-2-(5-nitrofurfurylidene)hydrazino]acetamide are obtained.

EXAMPLE XII

*2-[1-Benzoyl-2-(5-Nitrofurfurylidene)Hydrazino] Acetamide*

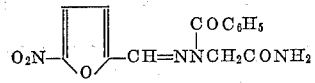

To a suspension of 170 g. (0.8 mole) of the compound of Example I in 800 ml. of dimethylformamide is added 100 ml. (120 g., 0.85 mole) of benzoyl chloride while maintaining the temperature at about 20° C. with cooling. After stirring at room temperature for 1 hour the solution is poured into 6 liters of water and the brown solid which precipitates is filtered and rinsed with water. The crude solid is added to 500 ml. of boiling alcohol, filtered from an insoluble brown solid, and the filtrate treated with charcoal. On cooling a dark oil separates which partially crystallizes. Reheating this mixture to boiling gives an insoluble orange solid which is filtered from the hot solution to give 33 g., M.P. 170–185° C. The filtrate on cooling gives more oil which partially crystallizes. After boiling off about half of the alcohol the solid (7 g.) is filtered. Repeating this process gives an additional 2 g. The combined solids are recrystallized from 1200 ml. of alcohol with charcoal to give 34 g. (13.5%) of 2-[1-benzoyl-2-(5-nitrofurfurylidene)hydrazino]acetamide, M.P. 172° C., 185–186° C.

EXAMPLE XIII

2-[1-Acetyl-2-(5-Nitrofurfurylidene)Hydrazino]-N-Methylacetamide

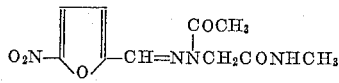

A suspension of 50 g. (0.22 mole) of the compound of Example VII in 250 ml. of acetic anhydride is heated on a steam bath until a clear solution is obtained and the product starts to separate. After cooling, the mass is recrystallized from 1500 ml. of isopropanol to give 53 g. (91%) of 2-[1-acetyl-2-(5-nitrofurfurylidene)hydrazino]-N-methylacetamide, M.P. 203.5–207.5° C.

EXAMPLE XIV

2-[1-Acetyl-2-(5-Nitrofurfurylidene)Hydrazino]-N-Ethylacetamide

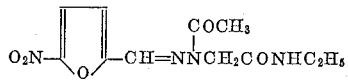

A suspension of 35 g. (0.146 mole) of the compound of Example II in 175 ml. of acetic anhydride is heated on the steam bath for 10 minutes. The clear solution is cooled and the solid filtered and washed with ether. The yield of 2-[1-acetyl-2-(5-nitrofurfurylidene)hydrazino]-N-ethylacetamide is 36 g. (88%), M.P. 204–207° C.

EXAMPLE XV

2-{1-Acetyl-2-[3-(5-Nitro-2-Furyl)Allylidene]Hydrazino}Acetamide

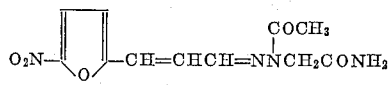

A suspension of 50 g. (0.21 mole) of the compound of Example V in 240 ml. of acetic anhydride is heated to boiling. At the boiling point the solid dissolves and then the product starts to separate. After cooling, the solid is filtered and rinsed with alcohol. The yield of 2-{1-acetyl-2-[3-(5-nitro-2-furyl)allylidene]hydrazino}acetamide is 47.3 g. (80%), M.P. 223–230° C.

EXAMPLE XVI

2-[1-Acetyl-2-(α-Methyl-5-Nitrofurfurylidene)Hydrazino]Acetamide

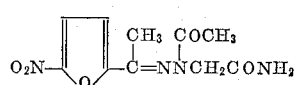

A suspension of 94 g. (0.42 mole) of the compound of Example VI in 305 ml. of acetic anhydride is heated on the steam bath for 30 mins. On cooling the clear red solution, a yellow solid separates and is filtered and rinsed with ether. Two recrystallizations from isopropanol give 31 g. (27%), M.P. 154–160° C. of 2-[1-acetyl-2-(α-methyl-5-nitrofurfurylidene)hydrazino]acetamide.

EXAMPLE XVII

2-[1-Acetyl-2-(5-Nitrofurfurylidene)Hydrazino]Diacetamide

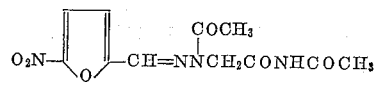

(A) A suspension of 60 g. (0.236 mole) of the compound of Example IX in 300 ml. of acetic anhydride is treated with 3 ml. of concentrated sulfuric acid and heated on the steam bath. After 10 mins. heating, the solid is nearly in solution and the product starts to separate. The mixture is cooled and the solid filtered and rinsed with alcohol. The yield of 2-[1-acetyl-2-(5-nitrofurfurylidene)hydrazino]diacetamide is 48 g. (69%), M.P. 212–213° C.

(B) To a suspension of the compound of Example I in an excess of acetic anhydride is added a catalytic amount of concentrated sulfuric acid. The solid gradually dissolves and then a solid separates from the solution. The pale yellow needles of 2-[1-acetyl-2-(5-nitrofurfurylidene)hydrazino]diacetamide melt at 213–214° C.

EXAMPLE XVIII

2-[2-(5-Nitrofurfurylidene)-1-(Phenylacetyl)Hydrazino]Acetamide

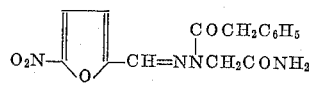

To a suspension of 115 g. (0.543 mole) of the compound of Example I is added 81 ml. (94.5 g., 0.16 mole) of phenylacetyl chloride while maintaining the temperature at 20–25° C. After standing for 30 minutes, the solution is poured into 4050 ml. of water. The gummy solid is triturated several times with water and then recrystallized from 1500 ml. of alcohol. The yield of 2-[2-(5-nitrofurfurylidene)-1-(phenylacetyl)hydrazino]acetamide is 109 g., M.P. 151–153° C. A second recrystallization of the solid from 1700 ml. of alcohol with charcoal gives 88 g. (49%) M.P. 171–173° C.

EXAMPLE XIX

Ethyl 2-Carbamoylmethyl-3-(5-Nitrofurfurylidene)Carbazate

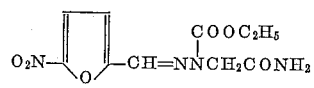

To a suspension of 63 g. (0.3 mole) of the compound of Example I in 150 ml. of dimethylformamide is added 112.5 ml. of ethyl chloroformate while maintaining the temperature at 20–25° C. After the solid dissolves the solution is poured into 2.25 l. of water. The orange precipitate is filtered, rinsed with water and recrystallized from 1700 ml. of alcohol with darco. The yield of ethyl 2-carbamoylmethyl-3-(5-nitrofurfurylidene)-carbazate is 38 g. (45%), M.P. 188–193° C.

EXAMPLE XX

2-[1-Acetyl-2-(5-Nitrofurfurylidene)Hydrazino]propionamide

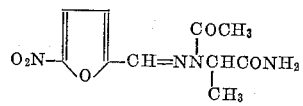

To a suspension of 38 g. (0.17 mole) of the compound of Example VIII in 85 ml. of dimethylformamide is added 14.5 ml. (16 g., 0.2 mole) of acetyl chloride at 20–25° C. with cooling. After stirring for 30 mins. the solution is poured into 850 ml. of water. The yellow precipitate is filtered, washed with water and recrystallized from 950 ml. of alcohol with charcoal. The yield of 2-[1-acetyl-2-(5-nitrofurfurylidene)hydrazino]propionamide is 31 g. (68%), M.P. 185–186.5° C.

EXAMPLE XXI

*2-[1-Dichloroacetyl-2-(5-Nitrofurfurylidene)Hydrazino]Acetamide*

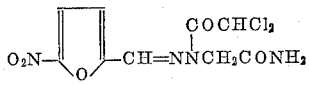

To a suspension of 50 g. (0.236 mole) of the compound of Example I in 175 ml. of dimethylformamide is added 40 g. (0.27 mole) of dichloroacetyl chloride with stirring and cooling to maintain a temperature of 20° C. After standing for 30 mins. the solution is poured into 1750 ml. of water and the precipitate filtered and washed with water. The yield of 2-[1-dichloroacetyl-2-(5-nitrofurfurylidene)hydrazino]acetamide is 66.5 g., M.P. 175–185° C. Recrystallization of the solid from 1100 ml. of isopropanol with charcoal gives 36.7 g. (48%), M.P. 192–197° C.

EXAMPLE XXII

*2-[1-(p-Nitrobenzoyl)-2-(5-Nitrofurfurylidene)Hydrazino]Acetamide*

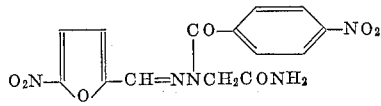

To a suspension of 85 g. (0.4 mole) of the compound of Example I in 800 ml. of dimethylformamide is added 85 g. (0.46 mole) of p-nitrobenzoyl chloride. On stirring the solid dissolves and then a yellow solid separates. After 30 mins. the mixture is poured into 4 l. of water and made basic with 10% sodium carbonate. The solid is filtered and washed with water. The yield of 2-[1-(p-nitrobenzoyl)-2-(5-nitrofurfurylidene)hydrazine]acetamide is 84 g., M.P. 250–270° C. Recrystallization of the solid from 3.75 l. of nitromethane with charcoal gives 56 g. (39%), M.P. 278–280° C.

EXAMPLE XXIII

*2-[1-Cyclohexanecarbonyl-2-(5-Nitrofurfurylidene)Hydrazino]Acetamide*

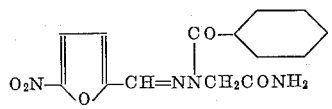

To a suspension of 63.75 g. (0.3 mole) of the compound of Example I in 300 ml. of dimethylformamide is added 34.25 g. (0.345 mole) of cyclohexanecarbonyl chloride while maintaining the temperature at 20° C. After 45 mins. the solution is poured into 2.25 l. of water. The solid is filtered and slurried in dilute sodium carbonate. The yield of 2-[1-cyclohexanecarbonyl-2-(5-nitrofurfurylidene)hydrazino]acetamide is 65.25 g., M.P. 80–85° C. The crude solid is recrystallized twice from 50% alcohol with charcoal and once from isopropanol to give 35.7 g. (37%), M.P. 150–170° C.

EXAMPLE XXIV

*2-[1-Isovaleryl-2-(5-Nitrofurfurylidene)Hydrazino]Acetamide*

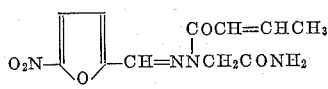

To a suspension of 85 g. (0.4 mole) of the compound of Example I in 400 ml. of dimethylformamide is added 48 g. (0.46 mole) of crotonyl chloride with cooling to maintain the temperature at 20–25° C. After 30–45 minutes the solution is poured into 3 l. of water. The solid is filtered and washed with water. The yield of 2-[1-crotonyl-2-(5-nitrofurfurylidene)hydrazino]acetamide is 98 g., M.P. 140–185° C. Two recrystallizations of the solid from acetonitrile give 42 g. (37.5%), M.P. 208–213° C.

EXAMPLE XXV

*2-[1-Isovaleryl-2-(5-Nitrofurfurylidene)Hydrazino]Acetamide*

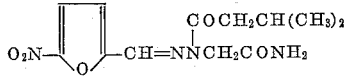

To a mixture of 106 g. (0.5 mole) of the compound of Example I in 375 ml. of dimethylformamide is added 70 ml. (0.575 mole) of isovaleryl chloride with cooling to maintain a temperature of 20° C. After 30 mins. at room temperature the solution is poured into 2250 ml. of water. The precipitate is filtered, washed with water and recrystallized three times from ethanol with charcoal to give 88 g. of 2-[1-isovaleryl-2-(5-nitrofurfurylidene)hydrazino]acetamide (60%), M.P. 155–157, 163–165° C.

EXAMPLE XXVI

*2[1-Butoxycarbonyl-2-(5-Nitrofurfurylidene)Hydrazino]Acetamide*

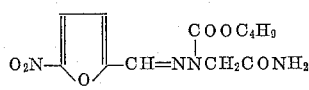

To a mixture of 63.75 g. (0.3 mole) of the compound of Example I in 150 ml. of dimethylformamide is added 153 g. (1.12 mole) of butyl chloroformate with cooling to maintain the temperature at 20° C. After the solid completely dissolves the solution is poured into 2250 ml. of water. The solid is filtered, washed with water and recrystallized twice from ethanol with charcoal to give 41.5 g. of 2-[1-butoxycarbonyl-2-(5-nitrofurfurylidene)-hydrazino]acetamide (44%), M.P. 185–187° C.

EXAMPLE XXVII

*2-[1-Isobutyryl-2-(5-Nitrofurfurylidene)Hydrazino]Acetamide*

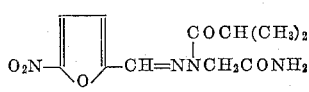

To 63.75 g. (0.3 mole) of the compound of Example I in 225 ml. of dimethylformamide is added 36 ml. (0.345 mole) of isobutyryl chloride with cooling to maintain the temperature at 20° C. After all the solid dissolves the solution is allowed to stand for 30 mins. and then poured into 2.25 l. of water. The solid is filtered and recrystallized twice from 1650 ml. of ethanol with charcoal to give 41 g. of 2-[1-isobutyryl-2-(5-nitrofurfurylidene)hydrazino]acetamide (48.5%), M.P. 215–220° C.

EXAMPLE XXVIII

*2-[1-Benzenesulfonyl-2-(5-Nitrofurfurylidene)Hydrazino]Acetamide*

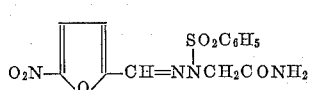

To 85 g. (0.4 mole) of the compound of Example I in 400 ml. of pyridine is added 50 g. (0.44 mole) of benzenesulfonyl chloride with cooling to maintain the temperature at 20° C. After stirring at room temperature for 15 mins. the mixture is heated on the steam bath for 10 mins. The cooled mixture is poured into 3 l. of water and the resulting solid filtered and washed with water and ethanol. The yield of 2-[1-benzenesulfonyl-2-(5-nitrofurfurylidene)hydrazino]acetamide is 76 g. M.P. 110–137° C. Two recrystallizations from ethanol with charcoal gives 26 g. (18.5%), M.P. 155–162° C.

EXAMPLE XXIX

*3-Chloropropyl 2-Carbamoylmethyl-3-(5-Nitrofurfurylidene)Carbazate*

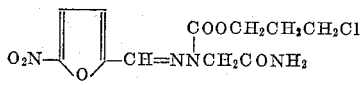

To 32 g. (0.15 mole) of the compound of Example I is added 87.8 g. (0.56 mole) of 3-chloropropyl chloroformate with cooling to maintain the temperature at 20° C. After the solid dissolves and gas evolution subsides the solution is poured into 1125 ml. of water. The solid is filtered, rinsed with water and recrystallized from 500 ml. of ethanol with charcoal to give 15.3 g. of 3-chloropropyl 2-carbamoylmethyl-3-(5-nitrofurfurylidene) - carbazate (32%), M.P. 144–148° C.

EXAMPLE XXX

*Pentyl 2-Carbamoylmethyl-3-(5-Nitrofurfurylidene) Carbazate*

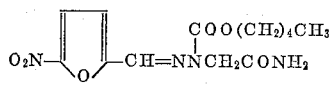

To 63.6 g. (0.3 mole) of the compound of Example I in 225 ml. of dimethylformamide is added 166.5 g. (1.116 moles) of pentyl chloroformate at 20° C. After the solid dissolves and gas evolution subsides, the solution is poured into 2,250 ml. of water. The solid is filtered, rinsed with water and recrystallized from 375 ml. of ethanol with charcoal to give 36.6 g. of pentyl 2-carbamoylmethyl-3-(5-nitrofurfurylidene)carbazate (37%), M.P. 148–153° C.

EXAMPLE XXXI

*Methyl 2-Carbamoylmethyl-3-(5-Nitrofurfurylidene) Carbazate*

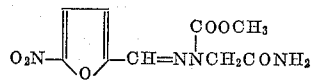

To 127.2 g. (0.6 mole) of the compound of Example I in 450 ml. of dimethylformamide is added 210 g. (2.22 moles) of methyl chloroformate with cooling to maintain the temperature at 20° C. After the solid dissolves and gas evolution subsides, the solution is poured into 4.5 l. of water. The solid is filtered, rinsed with water and recrystallized twice from 2.5 l. of nitromethane with charcoal to give 45.8 g. of methyl 2-carbamoylmethyl-3-(5-nitrofurfurylidene)carbazate (28%), M.P. 235–240° C.

EXAMPLE XXXII

*Propyl 2-Carbamoylmethyl-3-(5-Nitrofurfurylidene) Carbazate*

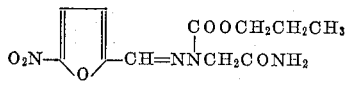

To 106 g. (0.5 mole) of the compound of Example I in 375 ml. of dimethylformamide is added 227.5 g. (1.85 moles) of propyl chloroformate with cooling to maintain the temperature at 20° C. After the solid dissolves and gas evolution subsides, the solution is poured into 3375 ml. of water. The solid is filtered, rinsed with water and recrystallized twice from 1.5 l. of water with charcoal to give 51 g. of propyl 2-carbamoylmethyl-3-(5-nitrofurfurylidene)carbazate (34%), M.P. 183–185° C.

EXAMPLE XXXIII

*Hexyl 2-Carbamoylmethyl-3-(5-Nitrofurfurylidene) Carbazate*

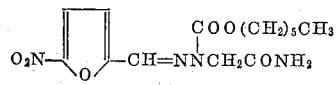

To 127.2 g. (0.6 mole) of the compound of Example I in 450 ml. of dimethylformamide is added 367.5 g. (2.22 moles) of hexyl chloroformate with cooling to maintain the temperature at 20° C. After the solid dissolves and gas evolution subsides, the solution was poured into 4.5 l. of water. The solid is filtered, rinsed with water and recrystallized once from isopropanol (500 ml.) with charcoal and twice from ethanol to give 60 g. of hexyl 2-carbamoylmethyl-3 - (5 - nitrofurfurylidene)carbazate (29%), M.P. 145–155° C.

EXAMPLE XXXIV

*Isobutyl 2-Carbamoylmethyl-3-(5-Nitrofurfurylidene) Carbazate*

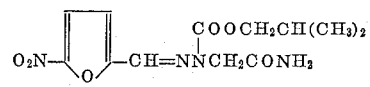

To 77.2 g. (0.368 mole) of the compound of Example I in 275 ml. of dimethylformamide is added 185 g. (1.4 moles) of isobutyl chloroformate with cooling to maintain the temperature at 20° C. After the solid dissolves and gas evolution subsides, the solution is poured into 2.75 l. of water. The solid is filtered, rinsed with water and recrystallized twice from acetonitrile with charcoal to give 44.5 g. of isobutyl 2-carbamoylmethyl-3-(5-nitrofurfurylidene)carbazate (39%), M.P. 85–95, 163–166° C.

EXAMPLE XXXV

*2-[1-Formyl-2-(5-Nitrofurfurylidene)Hydrazino] Acetamide*

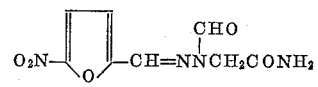

A mixture of 176 ml. (1.87 moles) of acetic anhydride and 74 ml. (1.95 moles) of 98% formic acid is heated at 50–60° C. for 2 hrs. with stirring. The solution is cooled to 30° C. and 50 g. (0.236 mole) of the compound of Example I added while maintaining the temperature at 32° C. The mixture is stirred at room temperature for 2 hrs., cooled and the solid filtered. After rinsing with ether and drying the yellow solid, 2-[1-formyl-2-(5-nitrofurfurylidene)hydrazino]acetamide weighs 37.3 g. (66%), M.P. 200–208° C.

EXAMPLE XXXVI

*1-Acetyl-2-(5-Nitrofurfurylidene)-1-(Piperidinocarbonylmethyl)Hydrazine*

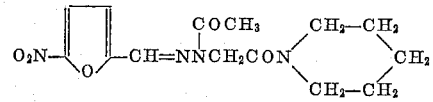

A stirred suspension of 76.5 g. (0.3 mole) of the compound of Example IV in 750 ml. of benzene is treated with 67.5 g. (0.325 mole) of phosphorous pentachloride and heated at 45° C. until evolution of HCl gas subsides. In this manner the temperature is increased to the boiling point in 5° C. increments and then boiled for several minutes. The hot mixture is stirred under vacuum (water pump) until the internal temperature drops to 20° and filtered. The filtrate is treated with piperidine with stirring and cooling until just basic to pH paper.

More benzene is added to the thick slurry before all the piperidine is added. The solid is filtered and rinsed with benzene and then water. The yield of 1-acetyl-2-(5 - nitrofurfurylidene) - 1 - (piperidinocarbonylmethyl)-hydrazine is 58.5 g. Recrystallization of the solid from 360 ml. of isopropanol with charcoal gives 40 g. (41%), M.P. 155–158° C.

EXAMPLE XXXVII

*1-Acetyl-1-(Morpholinocarbonylmethyl)-2-(5-Nitrofurfurylidene)Hydrazine*

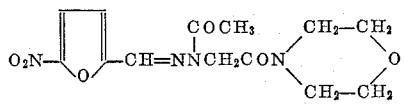

A stirred suspension of 76.5 g. (0.3 mole) of the compound of Example IV in 750 ml. of benzene is treated with 67.5 g. (0.325 mole) of phosphorous pentachloride and heated at 45° C. until evolution of HCl gas subsides. In this manner the temperature is increased to the boiling point in 5° C. increments and then boiled for several minutes. The hot mixture is stirred under vacuum (water pump) until the internal temperature dropped to 20° C. and filtered. The filtrate was treated with morpholine with stirring and cooling until just basic to pH paper. More benzene is added to the slurry before all the morpholine is added. The solid is filtered and rinsed with benzene and then water. The yield is 78 g., M.P. 153–156° C. Recrystallization of the solid from 700 ml. of alcohol with charcoal gives 50 g., M.P. 162–167° C. A second recrystallization of the solid from 800 ml. of alcohol gives 22.4 g. of solid melting at 182–184.5° C. and on cooling 21.5 g. of solid melting at 180–183° C. for a total yield of 43.9 g. (45%) of 1-acetyl-1-(morpholinocarbonylmethyl)-2-(5 - nitrofurfurylidene)hydrazine.

EXAMPLE XXXVIII

*2-[1-Acetyl-2-(5-Nitrofurfurylidene)Hydrazino]-N,N-Diethylacetamide*

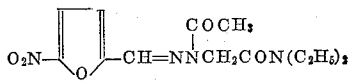

A stirred suspension of 76.5 g. (0.3 mole) of the compound of Example IV in 950 ml. of benzene is treated with 67.5 g. (0.325 mole) of phosphorous pentachloride and heated at 45° C. until evolution of HCl gas subsides. In this manner the temperature is increased to the boiling point in 5° C. increments and then boiled for several minutes. The hot mixture is stirred under vacuum (water pump) until the internal temperature drops to 20° C. and filtered. The filtrate is treated with diethyl amine with stirring and cooling until just basic to pH paper. The solid is filtered, washed with benzene and water, and recrystallized from 310 ml. of alcohol with charcoal. The yield of 2-[1-acetyl-2-(5-nitrofurfurylidene)hydrazino]-N,N-diethylacetamide is 37.6 g. (40%), M.P. 168–170° C.

EXAMPLE XXXIX

*1-Acetyl-2-(5-Nitrofurfurylidene)-1-(1-Pyrrolidinylcarbonylmethyl)Hydrazine*

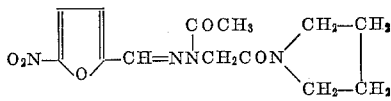

A stirred suspension of 76.5 g. (0.3 mole) of the compound of Example IV in 950 ml. of benzene is treated with 67.5 g. (0.325 mole) of phosphorous pentachloride and heated at 45° C. until evolution of HCl gas subsides. In this manner the temperature is increased to the boiling point in 5° C. increments and then boiled for ten minutes. The hot mixture is stirred under vacuum (water pump) until the internal temperature drops to 20° C. and filtered. The filtrate is treated with pyrrolidine with stirring and cooling until just basic to pH paper. The yellow solid is filtered, washed with benzene and water, and recrystallized from 1600 ml. of alcohol with charcoal to give 39 g. of 1-acetyl-2-(5-nitrofurfurylidene)-1-(1-pyrrolidinylcarbonylmethyl)hydrazine (42%), M.P. 206–208° C.

EXAMPLE XL

*2-[1-Acetyl-2-(5-Nitrofurfurylidene)Hydrazino]-N-Phenylacetamide*

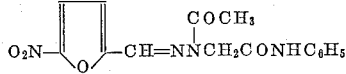

A stirred suspension of 76.5 g. (0.3 mole) of the compound of Example IV in 950 ml. of benzene is treated with 67.5 g. (0.325 mole) of phosphorous pentachloride and heated at 45° C. until evolution of HCl gas subsides. In this manner the temperature is increased to the boiling point in 5° C. increments and then boiled for five minutes. The hot mixture is stirred under vacuum (water pump) until the internal temperature drops to 20° C., and filtered. The filtrate is treated with aniline with stirring and cooling until just basic to pH paper. The solid is filtered and washed with benzene water and ether. The yield is 75 g., M.P. 130–160° C. Recrystallization of the solid from 2.1 l. of alcohol with charcoal gives 36.3 g. M.P. 200–220° C., and concentrating the filtrate to one-fourth the volume and cooling gave 4.7 g., M.P. 200–215° C. Recrystallization of the two crops from 500 ml. of acetonitrile with charcoal gave 27.5 g. of 2-[1-acetyl-2-(5-nitrofurfurylidene)hydrazino]-N-phenylacetamide (28%), M.P. 212–218° C.

EXAMPLE XLI

*2-[1-Acetyl-2-(5-Nitrofurfurylidene)Hydrazino]-N-Hydroxymethyl Acetamide*

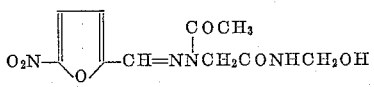

To 4.5 g. (0.018 mole) of the compound of Example IX in 5 ml. of 37% formaldehyde diluted with 15 ml. of water is added a pinch of sodium carbonate. After boiling about 15 mins. the mixture is filtered. The precipitate which separates on cooling is collected, washed with about 25 ml. of water, 7 ml. of methanol and 25 ml. of ether. After air drying at room temperature the weight is 3.1 g. (63%), M.P. 175.5–177.5° C. The product 2-[1-acetyl-2 - (5-nitrofurfurylidene)hydrazino] - N - hydroxymethyl acetamide is recrystallized from 20 ml. of water containing 5 ml. of 37% formaldehyde. The solid is washed with 25 ml. of water, and a little each of methanol and ether, 1.5 g., M.P. 176–176.5° C.

What is claimed is:

1. A chemical compound having antimicrobial activity upon oral administration of the formula:

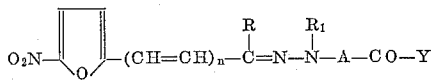

wherein
- $n$ represents a number from zero to one;
- R represents a member of the group consisting of hydrogen and methyl;
- $R_1$ represents a member of the group consisting of lower alkanoyl, crotonyl, benzoyl, phenylacetyl, halo (lower) alkanoyl, p-nitro-benzoyl, benzenesulfonyl, lower alkoxycarbonyl, halo(lower)alkoxycarbonyl and cyclohexylcarbonyl;
- A represents a lower alkylene group; and
- Y represents a member of the group consisting of amino, lower alkylamino, di(lower)alkylamino, acetylamino, hydroxy(lower)alkylamino, phenylamino, piperidyl, pyrrolidyl and morpholinyl.

2. The chemical compound 2-[1-acetyl-2-(5-nitrofurfurylidene)hydrazino]acetamide of the formula:

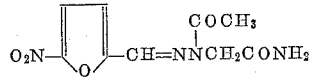

3. The chemical compound ethyl 2-carbamoylmethyl-3-(5-nitrofurfurylidene)carbazate of the formula:

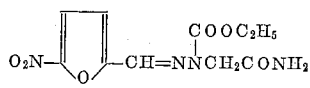

4. The chemical compound 2-[1-formyl-2-(5-nitrofurfurylidene)hydrazino)acetamide of the formula:

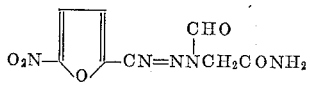

5. The chemical compound 2-[1-acetyl-2-(5-nitrofurfurylidene)hydrazino]-N-methylacetamide of the formula:

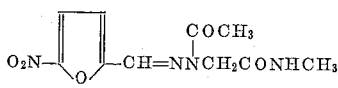

6. The chemical compound 2-[1-benzoyl-2-(5-nitrofurfurylidene)hydrazino]acetamide of the formula:

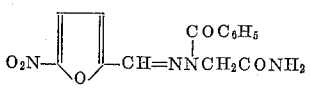

7. A chemical compound of the formula:

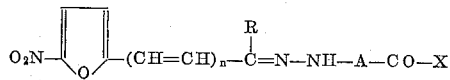

wherein
  *n* represents a number from 0 to 1;
  A represents a lower alkylene group;
  R represents a member of the group consisting of hydrogen and methyl; and
  X represents a member of the group consisting of amino and lower alkylamino.

8. The chemical compound 2-(5-nitro-2-furfurylidenehydrazino) acetamide of the formula:

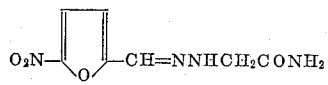

9. The chemical compound N-ethyl-2-(5-nitrofurfurylidenehydrazino)-acetamide of the formula:

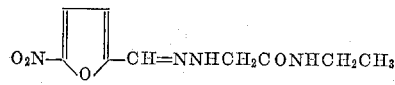

10. The chemical compound 2-(5-nitrofurfurylidenehydrazino)propionamide of the formula:

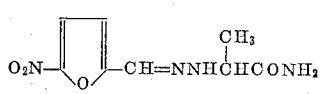

References Cited in the file of this patent
UNITED STATES PATENTS 2,943,019    Natt _____ June 28, 1960
3,075,877    Johnson _____ Jan. 29, 1963

OTHER REFERENCES

Bailey et al.: Ber. Deut. Chem., vol. 33, pages 1520 to 1537 (1900).
Beilsteins Handbuch der Organischen Chemie, 4th Ed., vol. 4, pages 556 to 558 (system no. 390), Julius Springer, Berlin, Germany (1922).
Chem. Abstracts, vol. 50, cols. 13861–13862 (1956).
Chem. Abstracts, vol. 52, cols. 20388–20389 (1958).